Figure 1:
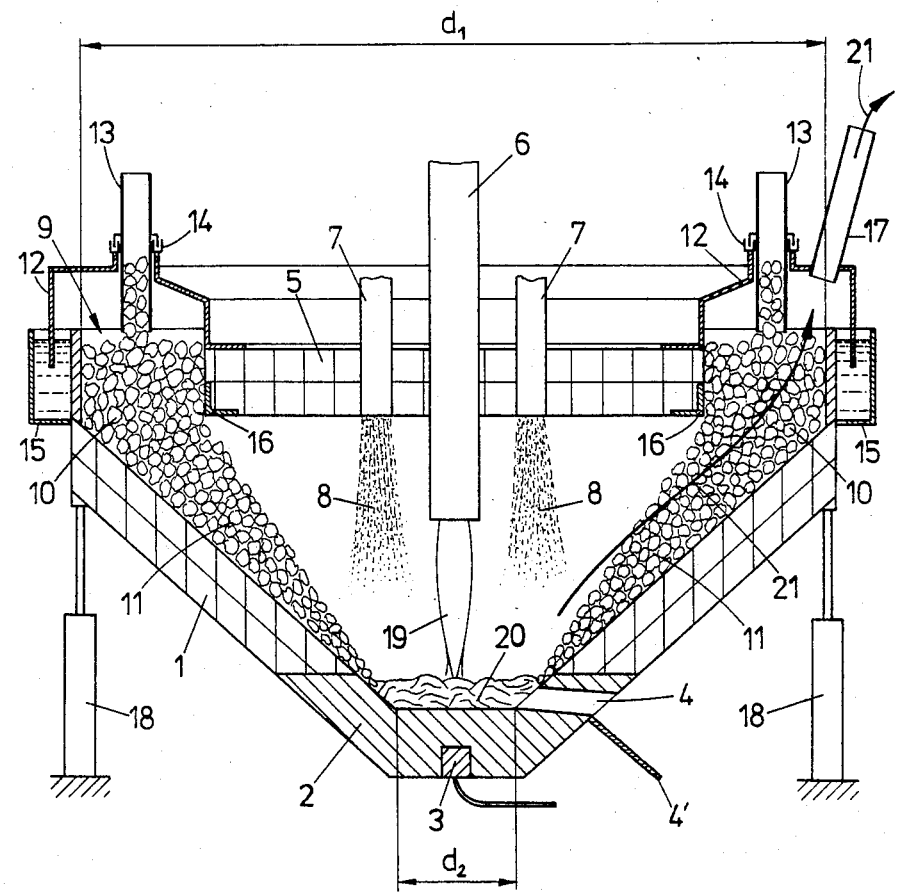

United States Patent [19]

Ebeling et al.

[11] Patent Number: 4,644,557
[45] Date of Patent: Feb. 17, 1987

[54] PROCESS FOR THE PRODUCTION OF CALCIUM CARBIDE AND A SHAFT FURNACE FOR CARRYING OUT THE PROCESS

[75] Inventors: Joachim Ebeling, Trostberg; Peter Friedrich, Tacherting; Herbert Jekat, Schopfheim, all of Fed. Rep. of Germany; Walter Lugscheider, Linz, Austria; Ernst Riegler, Enns, Austria; Ernst Zajicek, Ottensheim, Austria; Walter Achleitner, Linz, Austria; Ferdinand Jarema, Linz, Austria

[73] Assignees: SKW Trostberg Aktiengesellschaft, Fed. Rep. of Germany; Voest-Alpine Aktiengesellschaft, Austria

[21] Appl. No.: 751,078

[22] Filed: Jul. 1, 1985

[30] Foreign Application Priority Data

Aug. 3, 1984 [AT] Austria .................................. 2508/84

[51] Int. Cl.$^4$ .......................... H05H 1/00; H05B 7/00
[52] U.S. Cl. ................................................... 373/22
[58] Field of Search ...................... 373/18, 79, 80, 81, 373/22–24; 75/10 R; 423/155; 219/121 PA, 121 PB

[56] References Cited

U.S. PATENT DOCUMENTS 2,769,705 11/1956 Övrom Sem ...................... 373/81 X
3,828,107 8/1974 Sone ....................................... 373/22

FOREIGN PATENT DOCUMENTS 1508032 10/1970 Fed. Rep. of Germany ........ 373/18

Primary Examiner—Roy N. Envall, Jr.
Attorney, Agent, or Firm—Handal & Morofsky

[57] ABSTRACT

In a process for the production of calcium carbide in a shaft furnace, a plasma arc (plasma torch) is generated by the introduction of electric energy with the help of a plasma burner device penetrating the upper cover of the shaft furnace. A counter electrode is provided in the bottom part of the shaft furnace. About the plasma arc or torch, a burden mixture of calcium-oxide and carbon-containing substances is concentrically introduced so as to form a protective mound of solid burden components on the inner wall of the furnace. In order to provide an operationally safe process by using plasma burners, with which both coarse and fine-grain burden components may be employed and with which calcium carbide is obtained in higher yields with an improved utilization of the energy consumed, the burden mixture is used separately as a coarse-grain fraction and as a fine-grain fraction. The coarse-grain fraction is introduced through an annular gap between the furnace wall and the furnace cover so as to form a movable protective mound along the furnace wall. The fine-grain fraction is introduced into the space between the plasma arc and the protective mound. The process gas forming at the reaction emerges through the coarse-grain-fraction protective mound and the annular gap. A shaft furnace includes a refractorily lined furnace wall and an upper cover, through which a plasma burner device and a charging device are guided. A counter electrode is provided in the bottom part of the furnace.

22 Claims, 2 Drawing Figures

PROCESS FOR THE PRODUCTION OF CALCIUM CARBIDE AND A SHAFT FURNACE FOR CARRYING OUT THE PROCESS

The invention relates to a process for the production of calcium carbide in a shaft furnace, wherein a plasma arc (plasma torch) is generated by the introduction of electric energy with the help of a plasma burner means penetrating the upper cover of the shaft furnace and a counter electrode provided in the bottom part of the shaft furnace, about which plasma arc or torch a burden mixture of calcium-oxide and carbon-containing substances is concentrically introduced so as to form a protective mound of solid burden components on the inner wall of the furnace, as well as to the shaft furnace for carrying out the process.

The actually predominant technological process for the production of calcium carbide in electric low-shaft furnaces from calcined lime and carbonaceous compounds, i.a., has the disadvantage that, to a major extent, high-quality starting materials, such as, e.g., expensive grades of lumpy coke and/or anthracite, as well as an excess of lime must be employed in order to keep the electric resistance and the gas-passage behavior through the burden mixture sufficiently favorable so as to ensure a problem-free tapping of the molten calcium carbide. A further disadvantage of this conventional method is that a poor heat exchange takes place between the charge and the furnace gases on account of the electrodes being immersed from above into the burden and the smelting hearth.

Attempts have been made, therefore, to produce calcium carbide, for instance, in a shaft furnace with the help of plasma burners (Chemical Abstracts 95; 213 763z, 1981).

A disadvantage with carbide production by means of plasma burners is the fact that a major portion of calcium vaporizes at the high process temperatures, and escapes with the hot process gas from the hot plasma zones (cf. G. W. Healy, Proceedings of Electric Furnace Conference 1965, pp. 63 to 67). To be sure, it is basically possible to keep losses low by the fact that it is operated with a charge of coarse burden and with relatively large amounts of plasma gas at a relatively low plasma temperature; yet, it is necessary in this case to circulate large gas amounts and to clean the same by appropriate pre-treatment, whereby the process is rendered uneconomic.

In general, it is also critical to utilize the thermal content of gas, for instance, in a fluidized layer with dusty burden components according to U.S. Pat. No. 3,404,078, because volatile components, e.g., such as magnesium, build up in the form of oxides in irritating amounts.

In East German Pat. No. 149,853, a method is described with which calcium carbide is produced by blowing lime and coke dusts into a plasma jet and subsequently quenching and separating the fine-grain product. This process is uneconomic due to the low yield of calcium carbide and the high specific current demand on grounds of high thermal losses. This also holds true for the process according to East German Pat. No. 149,854, according to which molten calcium carbide from conventional electric low-shaft furnaces is upgraded to more than 80% by a thermal after-treatment with the help of a plasma jet, because the major amount of calcium carbide, in the electric low-shaft furnace, must be produced with a high excess of lime, and it is only the non-reacted portion of carbon that is caused to react with a high specific consumption of electric energy.

The invention has as its object to eliminate the above described difficulties and insufficiencies of the known processes for the production of calcium carbide, and to provide an operationally safe process by using plasma burners, with which both coarse and fine-grain burden components may be employed and with which calcium carbide is obtained in higher yields with an improved utilization of the energy consumed.

This object is achieved with a process of the initially defined kind in that the burden mixture is used separately as a coarse-grain fraction and as a fine-grain fraction, the coarse-grain fraction having a mean particle size of from 1 to 150 mm, preferably 3 to 100 mm, and the fine-grain fraction having a mean particle size of from 0.001 to 15 mm, preferably 0.001 to 6 mm, provided that the coarse-grain fraction is introduced through an annular gap between the furnace wall and the furnace cover so as to form a movable protective mound along the furnace wall, and the fine-grain fraction is introduced into the space between the plasma arc and the protective mound, with the process gas forming at the reaction emerging through the coarse-grain-fraction protective mound and the annular gap.

In this manner, high yields of calcium carbide and low thermal losses are attained, which is an essential pre-requisite for an economic process.

Advantageously, 5 to 95 percent by mass of the carbon amount required for the reaction is introduced with the coarse-grain fraction. As carbonaceous substances, brown coal and/or pit coal and/or anthracite and/or brown coal coke and/or pit coal coke and/or petroleum coke are particularly suited. By calcium-oxide-containing substances, those compounds are meant to either contain calcium oxide—such as calcined lime—or react into calcium oxide at the prevailing process temperatures, such as calcium carbonate or calcium hydroxide.

The protective mound formed by the coarse-grain fraction of the burden mixture at the inner wall of the furnace, which has the shape of a dumping cone, primarily serves to shield the refractorily lined furnace walls against the radiation of the plasma arc.

The fine-grain fraction is supplied to the furnace independently of the amount and composition of the coarsegrain fraction. The supply may be effected through one or several pipes extending through the furnace cover.

Suitably, the fine-grain fraction is introduced through a plurality of pipes coronally surrounding the plasma burner means or through an annular gap provided in the furnace cover. In this manner, a uniform envelope of the plasma torch by the fine-grain fraction is achieved so that the major portion of the radiation heat is absorbed by the thus formed dust veil. Since no special quality demands need be made on the fine-grain material, (for instance, fine-grain lime may be formed during the transportation of lumpy lime to the shaft furnace) there is the desire, for economic reasons, to keep the fine-grain portion as high as possible.

With the process according to the invention, advantageously up to 90 percent by mass of the burden mixture may be introduced as the fine-grain fraction. In order to provide for a high flow rate of fine-grain material and to prevent obstructions, the fine-grain fraction, according to an advantageous embodiment, is blown in with an inert gas, preferably a process gas.

According to a further advantageous embodiment of the method according to the invention, calcium carbide is continuously drawn off the bottom part of the shaft furnace in liquid form.

The invention also relates to a shaft furnace comprising a refractorily lined furnace wall and an upper cover, through which a plasma burner means and a charging means are guided, and a counter electrode provided in the bottom part of the furnace.

The plasma burner means mostly is comprised of one or several (for instance, three) cathode(s) projecting into the furnace interior through the upper cover, which is also lined with refractory material. Each cathode, in a usual manner, may be provided with an ignition device and may be movable in the vertical direction so that it can be displaced out of the furnace interior. The counter electrode for the so-called transferred plasma arc(s), which for practical purposes permanently functions as anode, is cooled by means of water or air.

The shaft furnace according to the invention for carrying out the process is characterized in that an annular gap, which is covered by an annular furnace hood, is provided between the upper marginal region of the furnace wall and the upper cover, and the furnace wall has a shape frustoconically converging towards the bottom part so as to form a furnace pot.

An advantageous effect of this convergingly designed furnace pot is the possibility of providing a very short tapping channel, which contributes to a problem-free emptying of the furnace.

Suitably, the ratio of the diameter of the bottom part to the diameter of the upper marginal region of the furnace wall is 1:2 to 10, preferably 1:2 to 5, so that angles of inclination between the furnace wall and the furnace bottom of from 100° to 150°, preferably 120° to 130°, will result.

Advantageously, the lower edge of the upper cover, which is directed to the furnace interior, is provided with a protective insert of wear-resistant material, preferably silicon carbide.

According to a preferred embodiment, supply means for the coarse-grain fraction are guided through the furnace hood in a gas-tight manner.

Furthermore, the furnace hood suitably is penetrated by at least one discharge duct for the CO-containing process gas. The process gas formed during the production of calcium carbide flows through the coarse-grain-fraction protective mound and through the annular gap, and is finally discharged to the outside outside through the discharge duct(s), cleaned there by usual methods, and processed further. By this process-gas guidance according to the counterflow principle, major thermal and yield losses by vaporizing calcium are prevented.

According to a further advantageous embodiment, the furnace hood is fastened to the upper which may contain water cooling means, if desired, and is sealed relative to the furnace interior by a water lute on the outer side of the furnace wall in order not to impede movements of the furnace pot.

Preferably, the bottom part of the furnace is lined with graphite-rich material and serves as a counter electrode or anode. The refractory lining of the inclined furnace wall is comprised of several layers, insulating (chamotte) bricks lying immediately at the metallic outer shell and carbon or graphite-rich materials preferably being used towards the furnace interior.

According to a further suitable embodiment, the furnace pot is mounted so as to be movable both in the axial and in the radial and/or in the horizontal directions by means of hydraulic piston means. Due to movements in one or both of these directions, the coarse-grain fraction piled up along the furnace wall is kept flowing; encrustments and cakings, and, thus, failures in the furnace operation are, therefore, avoided.

Preferably, the plasma burner means is comprised of one to three plasma burners. Thus, it is possible to lead several, (for instance, three burners, instead of a single plasma burner extending in the perpendicular furnace axis) through the upper cover - preferably at equal distances from the furnace axis. Therein, it is important to note that the fine-grain fraction is introduced into the space provided between the plasma arc(s) and the protective mound.

Among others, it is advantageous for this particular reason if the charging means for the fine-grain fraction (which is led through the upper cover) is designed as three to six pipes coronally surrounding the plasma burner means or an annular gap.

Figure 2:
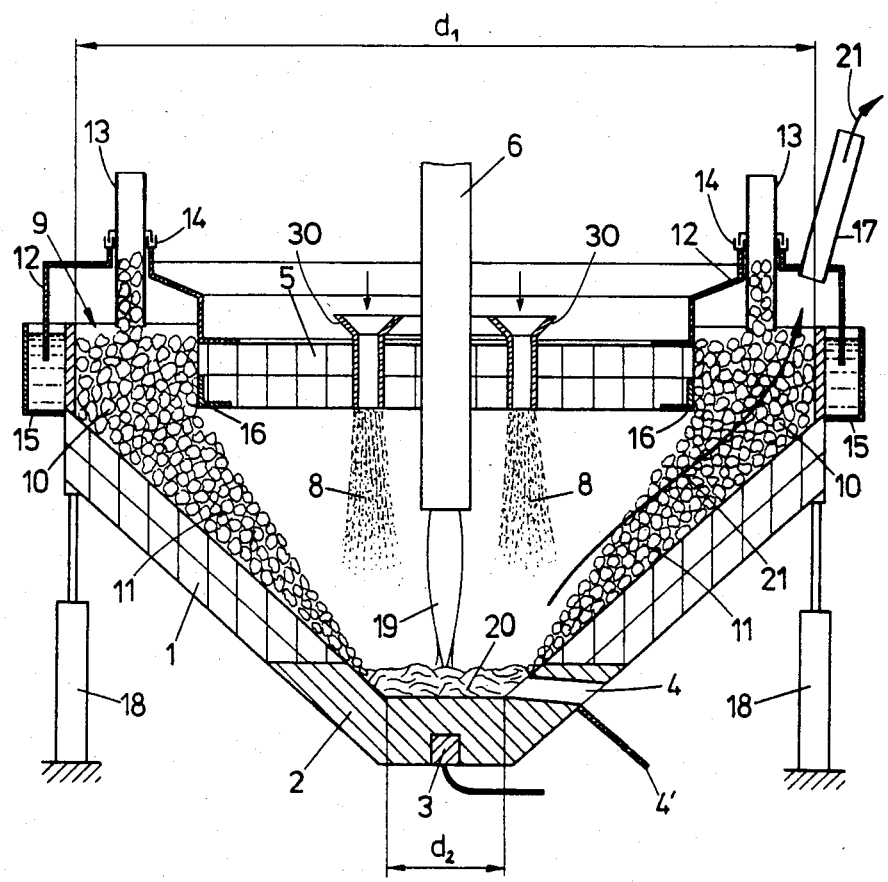

The invention will now be explained in more detail by way of one embodiment of the shaft furnace according to the invention and with reference to the accompanying draw FIGS. 1 and 2 are sectional illustrations of the shaft furnace according to the invention.

Referring to FIG. 1, a refractorily lined furnace wall 1 has a shape frustoconically converging towards the bottom part 2 of the shaft furnace and a diameter $d_1$ in its upper marginal region. The bottom part 2 constitutes the furnace pot, together with the inclined furnace wall 1. In the bottom part 2 of the shaft furnace, a water-cooled bottom electrode or anode 3, e.g., of copper, is provided. The bottom part 2, whose diameter is denoted by $d_2$, with the embodiment illustrated, is comprised of graphite-rich, electrically conductive material and, therefore, serves as a large-area electrode by itself. The bottom part 2 is penetrated by a tap opening 4 entering into a tap spout 4', which also may be made of copper and water-cooled, on the outer side of the furnace wall 1. Through the upper cover 5 of the shaft furnace, which is suspended on a carrying structure (not illustrated), a plasma burner means comprised of one single centrally arranged plasma burner 6 is led.

Also through the upper cover 5 are led six charging pipes 7 coronally surrounding the plasma burner 6, for the fine-grain fraction 8 of the burden mixture. The plasma burner 6 and the pipes 7 may be sealed relative to the furnace interior by sand lutes (not shown). Instead of the pipes 7, an annular gap 30 may be used for the introduction of the five-grain fraction 8, as is shown in FIG. 2.

The diameter of the upper cover 5 is chosen such that there is an annular gap 9 between the upper marginal region of the furnace wall 1 having the diameter $d_1$ and the upper cover 5, through which annular gap the coarse-grain fraction 10 of the burden mixture is introduced by forming a movable protective mound 11 at the inner wall of the shaft furnace. The annular gap 9 is covered by an annular furnace hood 12 fastened to the upper cover 5, and gas-tight supply means 13 for the coarse-grain fraction 10 are led through the furnace hood 12, the sealing being effected by means of sand lutes 14.

The peripheral part of the furnace hood 12 reaches into a water lute 15 mounted to the outer face of the furnace wall 1 so as to prevent any entry of false air into the furnace interior. The lower edge of the cover 5 is provided with a protective insert 16 of wear-resistant material in order to keep low the abrasion caused by the burden mixture passing by.

Furthermore, the furnace hood 12 is penetrated by a discharge duct 17 for the exit of carbon-monoxide-containing process gas. The furnace pot is displaceable in the axial direction by means of hydraulic piston means 18. In addition, means for moving the furnace pot horizontally may be provided.

In terms of size, the diameter $d_1$ of the upper marginal region of the furnace wall 1, for instance, may amount to 3.60 m, and that of the cover 5 may be about 2.40 m, from which an annular gap width of about 0.60 m results.

The hydraulic piston means 18, with a shaft furnace having the aforementioned dimensions, are suitably laid out for a lift of the furnace pot of about 0.5 m.

The ignition of the plasma arc 19 is effected in a usual manner by pre-heating the reaction zone and the bottom part 2 of the furnace, for instance, by burning additionally charged carbon with oxgen, and subsequently adjusting the desired output by the plasma gas supplied through the plasma burner 6 under current supply. As the plasma gas, any gas suitable for this purpose, such as carbon monoxide or hydrogen, preferably an inert gas, such as argon, may be used.

After the ignition of the plasma burner and the supply of the burden comprising the coarse and fine-grain fractions, the reaction into calcium carbide takes place at 2,000° to 2,500° C., with the molten calcium carbide 20 collecting in the bottom part 2 of the furnace. Tapping of the molten calcium carbide is effected in the lower part of the furnace, either, preferably continuously or discontinuously.

The carbon-monoxide-containing process gas formed in the reaction flows in the direction of the arrows 21 through the movable protective mound 11, leaving the shaft furnace through at least one discharge duct 17.

The principal advantages of the invention are to be considered in the high operational safety of the shaft furnace, the low thermal losses, the excellent yield with a high output, as well as the high purity (up to 95%) of the calcium carbide produced.

What we claim is:

1. In a process for the production of calcium carbide in a shaft furnace having
    a furnace bottom,
    a furnace wall and
    an upper cover, by
    (a) introducing electric energy through a plasma burner means that penetrates said upper cover, and through a counter electrode situated in the furnace bottom, to generate a plasma arc; and
    (b) introducing a burden mixture of calcium oxide and carbon-containing substances concentrically about said plasma arc so as to form a protective mound of solid burden components at the inner portion of the furnace wall;
    the improvement which comprises
    (1) separating the burden mixture into a coarse-grain fraction having a means particle size of from 1 to 150 mm, and a fine-grain fraction having a mean particle size of from 0.001 to 15 mm for separate introduction into the shaft furnace;
    (2) introducing the coarse-grain fraction through an annular opening between the furnace wall and furnace cover in a manner to form the protective mound and to cause it to move along the inner portion of the furnace wall; and
    (3) introducing the fine-grain fraction into the space formed between the plasma arc and the protective mound;
    wherein the process gas formed by the calcium carbide production emerges through said coarse-grain-fraction protective mound and through said annular opening.

2. A process as set forth in claim 1, wherein said coarsegrain fraction has a mean particle size of from 3 to 100 mm and said fine-grain fraction has a mean particle size of from 0.001 to 6 mm.

3. A process as set forth in claim 1, wherein said finegrain fraction is introduced through a plurality of changing pipes coronally surrounding said plasma burner means.

4. A process as set forth in claim 1, wherein said fine-grain fraction is introduced through an annular gap provided in said furnace cover.

5. A process as set forth in claim 1, further comprising introducing 5 to 95 percent by mass of the amount of carbon necessary for the calcium carbide production, together with said coarse-grain fraction.

6. A process as set forth in claim 1, wherein up to 90 percent by mass of the burden mixture is introduced as said fine-grain fraction.

7. A process as set forth in claim 1, wherein said finegrain fraction is blown into the shaft furnace with an inert gas.

8. A process as set forth in claim 1, further comprising continuously drawing off calcium carbide in liquid form from said bottom part of said shaft furnace.

9. A shaft furnace for the production of calcium carbide by generating a plasma arc and introducing a calciumoxide and carbonaceous substances-containing burden mixture of a coarse-grain fraction and a fine-grain fraction concentrically about said plasma arc, comprising
    a refractorily lined furnace wall having a shape frustoconically converging towards the bottom part of the furnace so as to constitute a furnace pot;
    an upper cover and a bottom part defining a furnace interior;
    a plasma burner means and a fine grain charging means both led through said upper cover;
    a counter electrode provided in said bottom part of said furnace;
    an annular opening provided between the upper marginal region of said furnace wall and said upper cover for introducing said coarse-grain fraction into the furnace and for forming a movable protective mound along the inner portion of said furnace wall in a manner to provide a space between said protective mound and said plasma arc, into which space said fine-grain fraction is introduced, and said protective mound being penetrated by process gas formed at the reaction site and leaving through said annular opening;
    and an annular furnace hood for covering said annular gap.

10. A shaft furnace as set forth in claim 9, wherein said bottom part has a first diameter and said upper marginal region of said furnace wall has a second diameter, the ratio of said first and second diameters being 1:2 to 10.

11. A shaft furnace as set forth in claim 10, wherein the ratio of said first and second diameters is 1:2 to 5.

12. A shaft furnace as set forth in claim 9, wherein said upper cover has a lower edge directed towards the furnace interior and a protective insert of wear-resistant material is provided on said lower edge.

13. A shaft furnace as set forth in claim 12, wherein said wear-resistant material is silicon carbide.

14. A shaft furnace as set forth in claim 9, further comprising gas-tight supply means for said coarse-grain fraction led through said furnace hood in a gas-tight manner.

15. A shaft furnace as set forth in claim 9, further comprising at least one discharge duct penetrating said furnace hood and provided for CO-containing process gas.

16. A shaft furnace as set forth in claim 9, wherein said furnace hood is fastened to said upper cover and a water lute is provided on the outer side of said furnace wall for sealing said furnace hood relative to said furnace interior.

17. A shaft furnace as set forth in claim 16, further comprising a water cooling means for said furnace hood.

18. A shaft furnace as set forth in claim 9, wherein said bottom part of said furnace is lined with a graphite-rich material so as to serve as a counter electrode.

19. A shaft furnace as set forth in claim 9, further comprising hydraulic piston means for moving said furnace pot in the axial and at least one of the radial and horizontal directions.

20. A shaft furnace as set forth in claim 9, wherein said plasma burner means is comprised of one to three plasma burners.

21. A shaft furnace as set forth in claim 9, wherein said charging means led through said upper cover for the introduction of said fine-grain fraction is comprised of three to six pipes coronally surrounding said plasma burner means.

22. A shaft furnace as set forth in claim 9, wherein said charging means led through said upper cover for the introduction of said fine-grain fraction is designed as an annular opening.

* * * * *